Patented Aug. 31, 1954

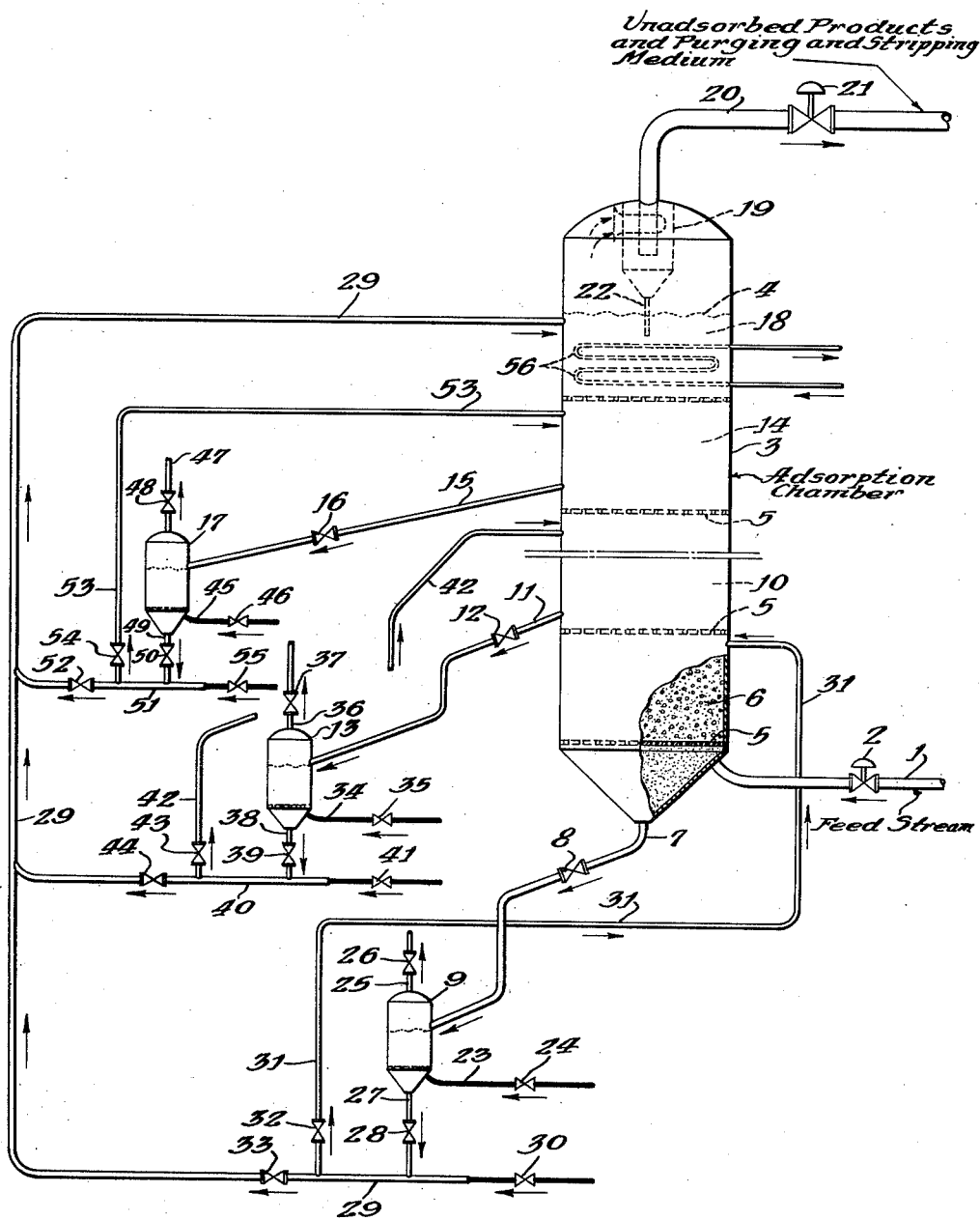

2,687,783

UNITED STATES PATENT OFFICE 2,687,783

SEPARATION OF GASES AND VAPORS IN A FLUIDIZED ADSORPTION PROCESS

Charles H. Watkins, Western Springs, Ill., assignor to Universal Oil Products Company, Chicago, Ill., a corporation of Delaware Application January 27, 1950, Serial No. 140,920

4 Claims. (Cl. 183—114.2)

This invention relates to an improved method for effecting the separation of fractionation of a mixed stream of gases and/or vapors in a fluidized adsorption processing operation. More particularly, the present improvement provides means for carrying out the fractionation or separation of desired components of a mixed stream by effecting the fluidized contacting of a subdivided solid adsorptive material and subsequently recovering desired fractions or gaseous components from separately withdrawn streams of the solid material, with each withdrawn stream being stripped in a fluidized manner within separate stripping zones.

Granular and finely divided adsorptive materials, such as char, clays, gels, activated carbons etc., have been used commercially in various ways to effect the recovery of desired solvents, gases or vapors, as well as in the fractionation of a mixed vaporous stream as encountered in petroleum refining operations. The contacting of the adsorptive material has been carried out in various ways, such as by the use of fixed beds of material, wherein the fluid material to be treated is caused to flow over or through the fixed bed, or alternatively, in a contacting method having the adsorbent material mixed with the liquid or solution to be treated, and subsequently settled or filtered out of the liquid stream after the contacting operation. More recently, the contacting of adsorptive material has been effected in a moving bed method, with the separation or fractionation operation being carried out in an elongated vertically disposed column. However, the moving bed methods have in general utilized rather elaborate mechanical or lifting means for maintaining the continuous circulation of the solid material through the vertical column and its various contacting zones. In addition, special flow distributing and disengaging decks have been required to control and regulate the flow of the descending bed of particles, and to effect the release of the desired gaseous fractions.

It is a principal object of the present invention to provide a continuous fluidized operation which will effect the separation or fractionation of a mixed gaseous and/or vaporous stream effecting the recovery of substantially pure desired fractions, with the fluidized operation providing the benefits of efficient, uniform and thorough contacting.

It is another object of the present invention to provide an improved fluidized contacting operation for the separation and/or fractionation of desired components from a mixed stream, by effecting both fluidized adsorptive contacting and subsequent fluidized stripping of separately withdrawn streams of adsorptive particles and fractions, which are separately withdrawn from vertically spaced portions of the fluidized contacting bed.

A further object of the invention is to provide fluidized contacting in an adsorption operation, wherein the fluidized countercurrent contacting of the adsorptive material and charge stream is carried out in a regulated controlled manner through the use of a packing material placed in the fluidized contacting zone.

It is a still further object of the invention to provide for improved fluidized stripping within separate confined stripping zones, whereby to recover relatively pure desired fractions or gas streams, and in turn provide for the regulated return of the stripped adsorptive material to selected portions of the contacting zones.

Briefly, the present improved method for effecting the continuous separation of a mixed gaseous and/or vaporous stream with a subdivided adsorbent solid material, comprises, maintaining a fluidized bed of particles of the adsorptive material in a vertically disposed contacting and adsorption column, passing the mixed stream upwardly through the particle bed and effecting the fluidized contacting of the particles therein, continuously withdrawing desired side cut streams of particles from vertically spaced portions of the contacting zone with desired fractions thereon, separately stripping side cut streams of particles within separate confined stripping zones with a gaseous stripping medium, separately withdrawing the desired side cut fractions from each of the separate stripping zones, discharging the resulting stripped particles from each stripping zone, and returning them to the contacting and adsorption zone for reuse therein.

The stripping medium may be high temperature steam, or other suitable inert gaseous medium which will not combine with the fractions being recovered and which can be subsequently separated from the desired gases or fraction without involved or expensive separation means. Also, the stripping operation is preferably carried out in a countercurrent fluidized manner in order to effect an efficient and thorough contacting of the particles for optimum yields of the desired products as well as effect the efficient stripping and purging of the subdivided particles prior to their being returned to the adsorption zone.

The cooling of the adsorptive particles may be effected externally of the adsorption zone, as they are recycled thereto, or alternatively cooling may be effected within the upper portion of the adsorptive column by indirect heat exchange with a suitable cooling medium being circulated through suitable heat exchange means.

In accordance with the present invention, a single elongated fluidized bed of particles is maintained in the contacting and adsorption zone and the fluidization maintained by the countercurrent upward passage of the charge stream, the latter being introduced at the lower end of the contacting column. The heavier component of the mixed charge stream is adsorbed by the particles within the lower portion of the fluidized bed, thus a stream of particles being withdrawn from this lower portion thereof will contain primarily only the heavier gaseous or vaporous component of the charge stream. The remaining components pass upwardly through the adsorption zone, and in the next higher portion of the fluidized bed a next heavier component is adsorbed by the particles therein, and is primarily withdrawn with a side stream of particles continuously withdrawn from the fluidized bed. Likewise, the various desired fractions or gaseous components of the mixed charge stream may be withdrawn from the upper vertically spaced portions of the fluidized bed in the contacting column. In each case, the separately withdrawn side cut streams of particles, with desired adsorbed fractions, are separately stripped in the confined stripping zones with steam or other gaseous stripping medium, as hereinbefore noted.

While a plurality of fractions may be fractionated or separated in accordance with the present operation, preferably the adsorption of only a few desired fractions should be carried out in a single contacting column, with the various heights of portions of the fluidized bed being varied in accordance with the quantities of material and contacting time needed to effect the substantially complete adsorption of the desired fractions which are to be withdrawn with the side cut streams of particles.

It is also a desirable feature of the present operation to utilize Raschig rings, Berl saddles, or the like, within the contacting or adsorption zone, as the packing material which will control the flow or fluidization of the subdivided adsorptive material. In other words, the packing material is provided in relatively large size pieces which will remain relatively static during the fluidized operation so as to restrict the upward movement of the particles from one portion of the contacting column to another, but will enhance the overall fluidization properties of the particles throughout the fluidized bed. This feature is a particular advantage in a separation or fractionation process, for the selective adsorption of the desired fractions or components is made within the vertically spaced portions of the fluidized bed of particles and the restriction of repeated up and down movement of particles tends to prevent the contamination of fractions within portions of the continuous fluidized bed. On the other hand, the use of a packing material permits the fluidization of particles larger than those which might normally be fluidized.

The operation of the present fluidized adsorptive system and additional advantagous features thereof will be more apparent upon reference to the accompanying drawing and the following description thereof.

Referring now to the drawing, a mixed feed stream is introduced by way of line 1 and valve 2 into a vertically disposed column 3, which is adapted to maintain a fluidized bed of particles of an adsorptive material, the upper extremity of the bed being indicated by the broken dotted line 4. For purposes of illustration, it will be assumed that the feed stream is a mixture of hydrocarbon vapors, including ethane, propane, and butane and heavier fractions as desired streams, as well as undesired fractions or components including methane, hydrogen, $CO_2$, etc. The adsorptive material may be a finely divided char which is effective in the separation of the lower boiling petroleum fractions, however, as hereinbefore noted, various adsorptive materials have been used effectively in the industry for various separations, and a suitable adsorptive material should be utilized in all cases to effect the desired separation. The char is utilized in a subdivided state, or small beads or spheres, which will be readily fluidized by the vaporous charge stream being introduced into the column, although in accordance with the preferred operation, packing material, such as Raschig rings or Berl saddles, are maintained in the interior of column 3 and are supported by suitable perforated plates or grids 5 at vertically spaced intervals, such that the fluidization of larger particles will be enhanced and such that the up and down travel of the char particles may be controlled and regulated. A countercurrent fluidized operation is carried out in the column, with the char descending from the upper portion of the column to the lower end thereof against an upwardly rising feed stream. The packing material does not prevent the gradual downward movement of the char, but does preclude excessive upward surging of the material within the contacting chamber, and also insures a uniform contacting of the bed of adsorptive material by the charge stream as it rises upwardly through the column.

In the lower portion of the fluidized bed, indicated as section 6, the butanes and heavier components of the feed stream are adsorbed upon contacting the char, so that as the char stream is withdrawn from the lower end of chamber 3 by way of line 7 and control valve 8, the butanes and heavier fractions are withdrawn and passed to the stripping chamber 9. In the present embodiment, two additional streams of adsorptive material with desired adsorbed fractions are withdrawn from the column 3, the desired propane fraction being withdrawn from section 10 of the fluidized bed, which is in turn above the lower section 6 at a point which is substantially free of the butane and heavier fractions. The adsorptive material with the desired propane fraction is withdrawn from section 10 by way of conduit 11 and control valve 12, with the stream being introduced into a separate confined stripping chamber 13. Similarly, a desired ethane fraction is withdrawn from a still higher portion of the fluidized bed in the chamber 3. Section 14 thereof providing an intermediate zone which is substantially free of propane and heavier fractions permitting the continuous withdrawal of a side cut stream of adsorptive material, and the desired ethane fraction, by way of line 15 and control valve 16 which in turn connects with and supplies a confined stripping chamber 17.

The lighter fractions and gases, together with a suitable purge stream, are passed from the upper adsorptive section 14 through a suitable cooling section 18, and subsequently discharged from the chamber 3 by way of a particle separator 19. Purge gas may be charged to the adsorption unit together with the feed stream, or alternatively, a suitable purge stream may be introduced into the upper cooling and purging section 18, in order to supply substantially clean adsorptive material to the lower portions of the fluidized bed for contacting the feed stream and for effecting the desired separation to selectively recover the desired fractions of the charge stream. The particle separator 19 permits the gaseous stream to be discharged from the upper portion of the chamber 3 by way of conduit 20 and outlet valve 21, while the char is recovered and returned to the fluidized bed by way of dip leg 22.

Separate stripping of the withdrawn streams of adsorptive material is continuously effected within each of the separate stripping zones, in accordance with the present invention, with a suitable stripping medium such as steam being introduced to chamber 9 by way of line 23 and valve 24, in order to countercurrently contact the descending bed of adsorptive material within the chamber 9. The removed butane and heavier fractions together with stripping medium, are discharged from the upper portion of the stripping chamber 9 by way of line 25 and control valve 26, while stripped char particles are continuously passed from the lower end of the chamber by way of the line 27 and control valve 28 to a suitable transfer or riser line 29 providing for the return of the adsorptive particles to the fluidized bed within the adsorptive zone of chamber 3. Steam or other suitable inert purging gas, such as flue gas, nitrogen, or the like, may be charged to the inlet of transfer conduit 29, having flow control valve 30, and providing means for effecting the fluidized transfer of the particles through the conduit 29 to the upper portion of the contact chamber 3 and into the purging and cooling zone 18.

Steam provides a desirable stripping medium for the removal of hydrocarbon vapors, such as described in the present embodiment, however, it is not intended to limit the improved operation to the use of any one stripping medium, for obviously other heated gaseous mediums may be used. For example, a heated stream of the gas or vapors being adsorbed from a particular zone may also be used advantageously as stripping medium, thus where butane and heavier gases are adsorbed by the particles passing to the stripping chamber 9, a heated butane stream may be charged by way of line 23 to the lower end of the stripping chamber 9 to effect the desired stripping therein.

It is also a feature of the present operation, to provide means for returning at least a portion of the adsorptive particles directly to the zone or portion of the fluidized contacting bed from which the stream of adsorptive material is being withdrawn. Transfer conduti 31, with control valve 32, provides means for passing a portion of the stripped particles from chamber 9 and transfer conduit 29 directly to zone 6, or lower portion of the fluidized bed maintained in the adsorption chamber 3. The regulation of valve 32, together with the control valve 33 in line 29, provides means for effecting the return of all or a portion of the stripped particles directly to the lower portion of the fluidized bed by way of conduit 31.

The stream of adsorptive particles withdrawn from section 10 of the fluidized bed in chamber 3 and transferred to stripping chamber 13 are contacted therein in a manner similar to that of chamber 9, by introducing steam or other stripping medium by way of line 34 and control valve 35 into the lower portion of the chamber 13 to effect the counter-current contacting and stripping in a fluidized manner, and the removal of the desired propane fraction adsorbed on the particles. The propane fraction together with the stripping medium is discharged from the upper portion of chamber 13 by way of line 36 and valve 37, while stripped adsorptive particles are discharged from the lower end of the chamber by way of conduit 38 and valve 39 into a transfer line 40. A suitable transporting and fluidizing medium, which may be steam or other suitable stripping and purging medium, is introduced to the transfer conduit 40, with control of flow regulated by valve 41, and effects the transfer of the adsorptive particles to the adsorptive chamber 3 by way of conduit 29. Alternatively, all or a portion of the stripped adsorptive material may be returned from the independent stripping chamber 13 directly to that portion of the fluidized bed in the adsorptive column from which the particles were withdrawn, by way of transfer line 42 and control valve 43. Regulation and control of the quantity of material being returned to the intermediate portion of the fluidized bed and the upper portion of the bed within purging and cooling zone 18, may be regulated by the valve 43 and line 42 and a suitable flow regulating valve 44 within line 40.

As described in connection with stripping chambers 9 and 13, the stream of adsorptive particles passing to stripping chamber 17 by way of conduit 15, are countercurrently contacted and stripped in the latter zone by means of a stripping medium passed to the lower portion thereof by way of line 45 and control valve 46. A desired light ethane fraction together with stripping medium is discharged from the upper portion of stripping chamber 17 by way of line 47 and valve 48, with the stripped particles being continuously discharged from the lower end of the chamber 17 by way of line 49 and control valve 50. The adsorptive particles may then be continuously returned to the adsorption chamber 3 by way of a transfer line 51, having control valve 52, and transfer riser line 29, or alternatively, all or a portion of the material may be transfered by way of conduit 53 and control valve 54 to the section or portion 14 of the fluidized bed in chamber 3 from which the adsorbed fraction and stream of adsorbed material is withdrawn for transfer to the stripping chamber 17. Steam or other suitable stripping medium is introduced into the conduit 51, with flow being controlled by valve 55, to effect the desired fluidized transfer of the adsorptive material through either or both of the conduits 29 and 53.

It should also be noted, that a stripping medium other than steam may be introduced into each of the respective stripping chambers 13 and 17, the stripping medium being a heated relatively inert gaseous medium, or alternatively, a heated gas or vaporous fraction corresponding to that which is being adsorbed from that particular portion of the fluidized bed of adsorptive material in chamber 3 and being passed to each of the independent stripping chambers. Thus, a heated propane fraction may be introduced by way of line 34 to stripping chamber 13 to effect the desired stripping therein and the resulting product stream is not contaminated by a diluent or stripping medium. Likewise, in accordance with the present illustrative example of the improved adsorptive separation or fractionation system, a heated ethane stream may be introduced by way of line 45 to stripping chamber 17 to effect the removal of the desired adsorbed fractions.

The present adsorption system as provided by this invention, provides for an efficient separation of fractions and is particularly advantageous because of the flexibility of operation which is readily obtained. In the usual moving bed adsorptive system, all of the contacting and adsorptive material passes through the entire length of the adsorption zone, while in the present operation, separate streams of adsorptive material are continuously withdrawn from upper and intermediate portions of the bed within the adsorption chamber, so that shorter paths of travel for the particles result. Further, smaller quantities of material are stripped in the independent stripping zones and there is effected a relatively efficient removal of the desired adsorbed fraction or gas, with less stripping medium being required.

It is also a particular advantage of the present operation, to provide a moving bed adsorption system, with a continuously descending bed of particles, having a reduced temperature gradient or temperature build-up within the adsorptive bed. In other words, much of the latent heat which is given up to the adsorptive material, as the gaseous or vaporous fractions are continuously adsorbed by the particles, is continuously withdrawn with the streams. In addition the continuous introduction of stripped and cooled particles to intermediate points of the fluidized bed, aid in reducing the temperature gradient of the column and in turn provide more efficient separation of the mixed charge stream. Indirect cooling means, as indicated by coil 56, is provided in the upper portion of the bed. A suitable fluid cooling medium may be circulated through the coil 56 to effect the cooling of the adsorptive material prior to entering the lower adsorptive zones of the fluidized bed. Although not indicated in the drawing, cooling means may be provided for heat exchange with the particles being returned by way of each of the independent return lines which carry particles from the independent stripping zones to the various vertical sections or portions of the adsorption bed within chamber 3, whereby to insure the return of relatively cool stripped adsorptive material into the various portions of the bed.

Although not shown in the drawing suitable screening means may be provided at each particle withdrawal line to prevent the passage of the packing material along with the adsorptive material.

It may again be noted, that it is not intended to limit the present improved adsorptive, separating or fractionating method to any one separation process, for obviously in addition to the separation of petroleum fractions as hereinbefore described, it is particularly effective with other gaseous and vaporous separations. For example, the recovery of $CO_2$ from flue gas, the separation of acetylene from other oxidation gases, or the recovery of a particular petroleum fraction such as ethane, propane, or ethylene, from natural gas or waste refinery gases. The recovery of ethylene, which is useful as a starting material in many chemical or synthesis processes, is also effectively accomplished by the present adsorptive system, where the desired ethylene stream is produced along with other hydrocarbon fractions and oxidation products from an autothermic or oxidative cracking process.

I claim as my invention:

1. A method for effecting the continuous separation of a charge stream of mixed gaseous and/or vaporous fractions in the presence of subdivided adsorbent solid particles, which comprises, maintaining a descending fluidized bed of said particles within an elongated vertically disposed contacting and adsorption zone containing larger sized non-adsorptive packing material which remains relatively static during the fluidization of said particles, continuously passing said mixed charge stream to the lower portion of said zone and upwardly countercurrently to said descending fluidized bed of particles and effecting thereby the contacting and fluidizing thereof, continuously withdrawing side-cut streams from vertically spaced portions of said fluidized bed within said adsorption zone with desired adsorbed fractions on each of said side-cut streams, separately stripping each stream of particles within separate confined stripping zones with a gaseous stripping medium, separately withdrawing recovered side-cut fractions from each of said stripping zones, discharging resulting stripped particles from each of said stripping zones and returning said stripped particles to said adsorption zone with at least a portion thereof from each individual stripping zone being returned to that portion of said adsorption column from which the particular side stream was withdrawn, with the remaining portions of said stripped particles being returned to the upper portion of said adsorption column.

2. The method of claim 1 further characterized in that said gaseous stripping medium utilized within said individual stripping zones comprises high temperature steam.

3. The method of claim 1 further characterized in that said gaseous stripping medium utilized in said separate confined stripping zones varies at each of said zones, with the heated gaseous fraction being introduced to each of said stripping zones corresponding to the fraction being adsorbed by said side-cut stream of particles recovered at each of said separate zones.

4. A method for effecting the continuous separation of a mixed charge stream of gaseous and/or vaporous fractions in the presence of a subdivided adsorbent solid material which comprises, maintaining a descending fluidized bed of subdivided particles of said material in an elongated vertically disposed contacting and adsorption zone, with larger sized non-adsorptive packing material maintained within said fluidized contacting and adsorption zone whereby fluidization of said particles is regulated within said descending bed of particles, continuously introducing said mixed stream to the lower portion of said contacting zone and passing it upwardly through said fluidized bed of particles and effecting the contacting and fluidizing of the latter in a countercurrent flow, continuously withdrawing side-cut streams of particles with the desired adsorbed fractions thereon from vertically spaced portions of said elongated fluidized bed of particles, separately stripping each withdrawn stream of particles in separate confined stripping zones with a gaseous stripping medium which countercurrently contacts and fluidizes said withdrawn particles, separately recovering desired side-cut fractions from each of said stripping zones, discharging resulting stripped particles from said stripping zones and returning them to said adsorption zone for reuse therein with at least a portion of the stripped particles from each of said stripping zones returned directly in a fluidized stream to the vertical portion of the fluidized bed of said adsorption zone from which the particles were withdrawn.

References Cited in the file of this patent

UNITED STATES PATENTS

| Number | Name | Date |
|---|---|---|
| 1,872,080 | Harris | Aug. 16, 1932 |
| 2,335,009 | Holloway | Nov. 23, 1943 |
| 2,354,383 | Kiesskalt | July 25, 1944 |
| 2,476,472 | Arnold et al. | July 19, 1949 |
| 2,495,842 | Gilliland | Jan. 31, 1950 |
| 2,548,502 | Small | Apr. 10, 1951 |
| 2,557,680 | Odell | June 19, 1951 |
| 2,561,396 | Matheson | July 24, 1951 |